United States Patent
Morvan et al.

(10) Patent No.: US 6,826,401 B1
(45) Date of Patent: Nov. 30, 2004

(54) METHODS OF AUTOMATIC SUBSCRIPTION BETWEEN A MOBILE STATION AND A BASE STATION IN A TELECOMMUNICATIONS NETWORK, AND SYSTEMS IMPLEMENTING THEM

(75) Inventors: Isabelle Morvan, Rennes (FR); Lionel Tocze, Saint Domineuc (FR)

(73) Assignee: Canon Europa, N.V. (NL)

(*) Notice: Subject to any disclaimer, the term of this patent is extended or adjusted under 35 U.S.C. 154(b) by 556 days.

(21) Appl. No.: 09/716,471

(22) Filed: Nov. 21, 2000

(30) Foreign Application Priority Data

Jan. 14, 2000 (FR) .............................. 0000464

(51) Int. Cl.[7] .................................. H04Q 7/20
(52) U.S. Cl. .................. 455/435.1; 455/435.2; 455/410; 455/411
(58) Field of Search ................ 455/435.1, 410, 455/411, 502, 435.2, 423, 424, 425

(56) References Cited

U.S. PATENT DOCUMENTS

| | | | |
|---|---|---|---|
| 5,572,574 A | | 11/1996 | Barnes et al. |
| 5,649,286 A | * | 7/1997 | Frerking |
| 5,787,354 A | | 7/1998 | Gray et al. |
| 5,978,669 A | * | 11/1999 | Sanmugam |
| 6,041,231 A | * | 3/2000 | Suzuki |

FOREIGN PATENT DOCUMENTS

| | | |
|---|---|---|
| EP | 0 301 573 | 2/1989 |
| EP | 0 563 898 | 10/1993 |
| WO | 96/36194 | 11/1996 |

* cited by examiner

*Primary Examiner*—Erika Gary
*Assistant Examiner*—Huy Nguyen
(74) *Attorney, Agent, or Firm*—Fitzpatrick, Cella, Harper & Scinto

(57) ABSTRACT

For registering a mobile station with a base station, in a telecommunications network, a subscription operation is performed automatically, either

- following the power-up of the mobile station, if the mobile station is not registered with any base station, or
- if, after a predetermined period of time (TLOCK), stored in the mobile station, has elapsed, the mobile station has not succeeded in synchronising with and attaching itself to a base station with which the mobile station is already registered.

15 Claims, 5 Drawing Sheets

METHODS OF AUTOMATIC SUBSCRIPTION BETWEEN A MOBILE STATION AND A BASE STATION IN A TELECOMMUNICATIONS NETWORK, AND SYSTEMS IMPLEMENTING THEM

The present invention relates to methods of automatic subscription between a mobile station and a base station in a telecommunications network, and to systems implementing them.

The invention belongs to the field of cordless telecommunication network protection.

More precisely, the invention relates to a method and a device making it possible to automatically initiate the subscription procedure which enables a mobile station to obtain rights of access to a cordless base station.

The method and the device of the invention are particularly well adapted to a point to point cordless communication system.

Nevertheless, the invention may also apply to a system containing a limited, defined number of mobile stations per base station.

So as to prevent fraudulent use, cordless communication systems generally utilise security mechanisms in order to be able to authenticate equipment or the equipment user in a cordless system.

For example, the European standard, DECT ("Digital Enhanced Cordless Telecommunications", ETSI, EN 300 175), proposes mechanisms to authenticate DECT equipment.

When the authentication phase is successful, a mobile station is authorised to accede to the resources of the base station for which the mobile station has been authenticated.

The authentication procedure is particularly important when the base station allows access to resources of the gateway type to a public network, such as an STN (Switched Telephone Network), or a local network (of the Ethernet type, for example).

The authentication procedure generally requires an authentication key.

This key forms part of the data transferred when the mobile station user proceeds to a subscription or registration procedure with a base station.

Two methods of key allocation are essentially known:

A first method consists in manually keying-in the authentication key by means of a keyboard during the subscription phase. This is the case of the system described in document U.S. Pat. No. 5,572,574.

This method has the drawback of requiring an interface (of the keyboard type) for the user to be able to enter the key.

A second method consists in pre-configuring the system in the factory. Several types of pre-configuration are possible:

- all mobile stations and base stations having the same manufacturer share the same key. In this case any mobile station is able to operate with any base station having this same manufacturer. This solution is not very acceptable from the point of view of security;
- each mobile station has its own key and is pre-configured to operate with a given base station. This solution has the drawback of not permitting the cordless communication system to be re-configured without the intervention of an operator. This is the case of the system described in document EP-A-0 301 573.

The present invention aims at remedying the above drawbacks.

With this aim in view, the present invention provides a method of subscription of a mobile station to a base station in a telecommunications network, which is remarkable in that a subscription operation is carried out automatically, either following powering up of the mobile station, if the mobile station is not registered with any base station, or if, after a predetermined period of time, previously stored in the mobile station, has elapsed, the mobile station has not succeeded in synchronising with and attaching itself to a base station with which the mobile station is already registered.

Thus, the present invention makes it possible to automatically initiate the registration procedure between a mobile station and a base station, by eliminating the key input operation and therefore not requiring any interface for this purpose. In addition, the present invention makes it possible for a mobile station to register itself with a new base station without the intervention of an operator.

Moreover, the present invention has the advantage of being an extremely simple procedure for the user.

It also makes it possible to reduce the cost of the mobile station, given the possibility of doing without the keyboard.

Moreover, it makes it possible to automatically re-configure the association between a mobile station and a base station, which is useful when it is necessary to proceed to the replacement of a defective base station.

Furthermore, by virtue of the present invention, the subscription procedure is activated only when necessary, and not at each start-up, which provides increased security.

According to a particular feature, following power-up of the mobile station:

a test operation is performed, consisting, for the mobile station, of testing whether or not it is already registered with a base station.

This feature has the advantage of avoiding needless initiation of a subscription procedure, in the case where the mobile station is already registered with a base station.

According to a particular feature, during this test operation, it is determined whether or not a subscription table stored in the mobile station contains data.

This feature constitutes a very simple means of knowing if the mobile station is already registered with a base station.

According to a particular feature, following mobile station power-up, if the mobile station is already registered with a base station, an initialisation operation is carried out, consisting in activating a timer by allocating to it a value equal to the above-mentioned predetermined period of time.

This particular feature makes it possible to allocate, in an extremely simple fashion, a predetermined period of time in which to find the base station with which the mobile station is already registered.

According to a particular feature, during the subscription operation, the mobile station carries out a transmission operation, consisting in transmitting an authentication code to the base station.

This feature allows the base station, following verification of the code, to accept or to refuse the mobile station's request for right of access.

According to a particular feature, a stoppage operation is carried out, consisting of stopping the subscription operation of the mobile station to the base station if the subscription operation has not succeeded before a predetermined period of time has elapsed.

This feature makes it possible for the subscription procedure to be automatically stopped in the event of its failure and enables the system to be secured by limiting the time during which subscription is possible.

The present invention also concerns a mobile station in a telecommunications network, comprising means adapted to implement a method of subscription with a base station such as above.

With the same aim as mentioned above, the present invention proposes, in addition, a method of subscription of a base station to a mobile station in a telecommunications network, which is remarkable in that a subscription operation is carried out automatically, either following powering up of the base station, if the base station is not registered with any mobile station, or if, after a predetermined period of time has elapsed, the base station has not succeeded in attaching itself to a mobile station with which this base station is already registered.

The advantages of the method of subscription of a base station to a mobile station and of its particular features are similar to those of the subscription procedure for a mobile station to a base station, mentioned above.

According to a particular feature of the method of subscription of a base station to a mobile station, following power-up of the base station:

a test operation is performed, consisting, for the base station, in testing whether a mobile station is already registered with it.

According to a particular feature, during this test operation, it is determined whether or not a subscription table stored in the base station contains data.

According to a particular feature, following base station power-up, if the base station already has a mobile station registered with it, an initialisation operation is carried out, consisting in activating a timer by allocating to it a value equal to the above-mentioned predetermined period, previously stored in the base station.

According to a particular feature, during the subscription operation, the base station carries out a checking operation, consisting in checking a authentication code transmitted by the mobile station.

According to a particular feature, a stoppage operation is effected, consisting in stopping the operation of subscription of the base station to the mobile station if the subscription operation has not succeeded before a predetermined period of time has elapsed.

The invention also relates to a base station in a telecommunications network comprising means adapted to implementing a method of subscription to a mobile station such as above.

The invention also relates to:

an information storage means, readable by a computer or a microprocessor storing computer program instructions, making it possible to implement a subscription method such as above, and a partially or totally removable information storage means, readable by a computer or a microprocessor storing computer program instructions, making it possible to implement a subscription method such as above.

The invention also relates to a computer program product comprising instruction sequences to implement a subscription method such as above.

The particular features and advantages, not detailed above, of the mobile station, the base station, the information storage means and the computer program being the same as those for the subscription methods to which they relate, they are not repeated here.

Other particular features and advantages of the invention will emerge on reading the following detailed description of particular embodiments, which are given as examples in no way restrictive. The description refers to the accompanying drawings, in which:

FIG. 1 illustrates the electronic circuit 100 of a mobile station or a base station capable of implementing the invention.

Figure 1:
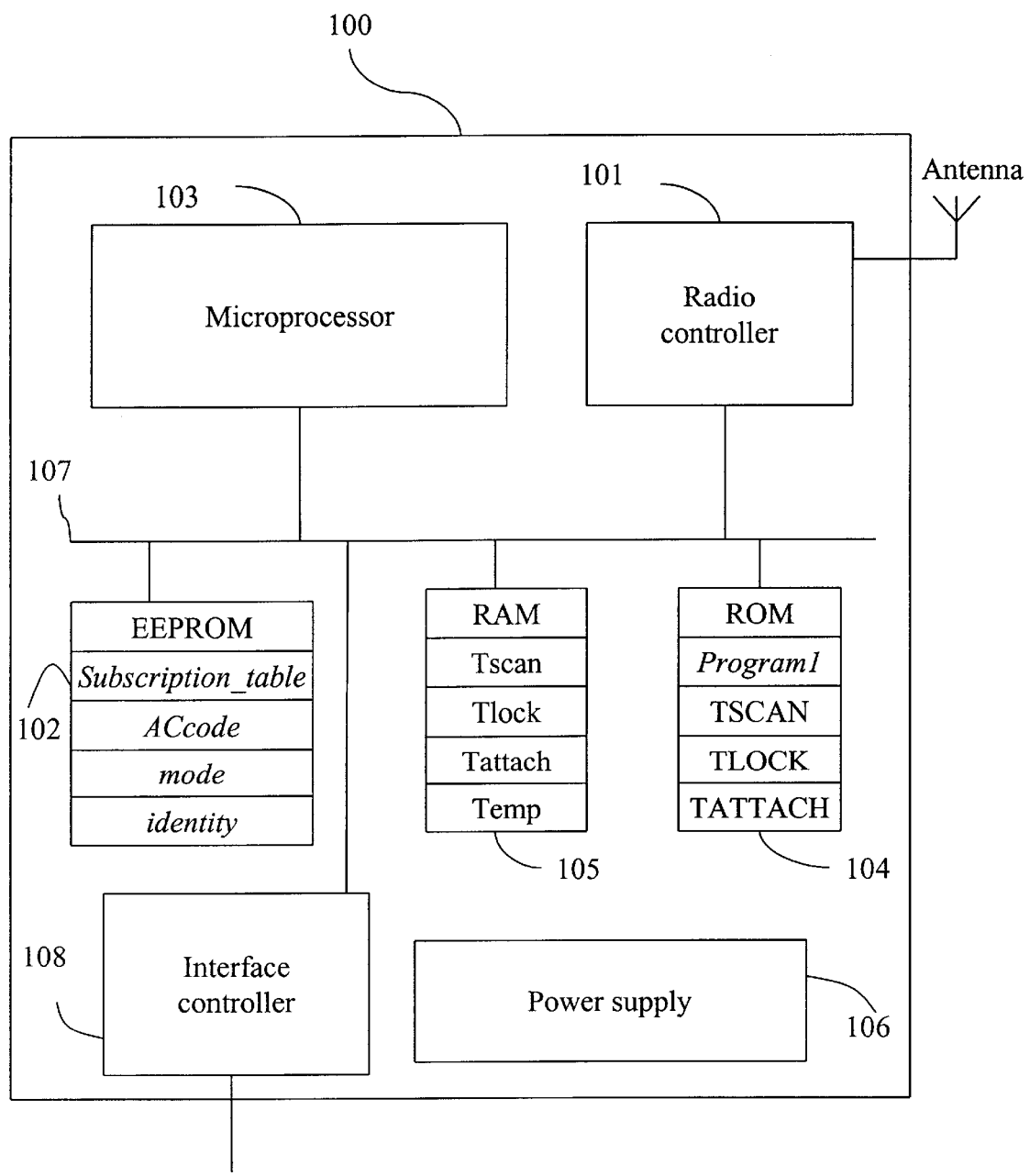
FIG. 1 illustrates schematically the structure of a mobile station or a base station capable of implementing the invention, in a particular embodiment.

The electronic circuit 100 comprises, interconnected by an address and data bus 107:

a radio unit 101 provided with an antenna, a non-volatile memory EEPROM 102, a microprocessor 103, a read only memory ROM 104, a random access memory RAM 105, and an interface controller 108.

Moreover, an electrical power supply 106 is provided to supply all the components of the electronic circuit 100 (the electrical connections regarding power supply are not depicted).

The interface controller 108 manages the interface between the mobile station or the base station and a network or a terminal (a printer, for example).

All the components depicted in FIG. 1 are well known to a person skilled in the art of processor communication circuits and, more generally, information processing circuits. They are not, therefore, detailed here. The electronic circuit 100 and in particular, the microprocessor 103 are adapted to make use of all the capacities of the DECT standard known prior to the present invention.

The microprocessor 103 is, in addition, adapted to implement the method of the invention and, in particular, the flow diagrams depicted in FIGS. 2 to 5.

The random access memory 105 contains registers which, for convenience, each bear the same name as the data they contain:

Tscan: timer associated with the subscription phase;

Tlock: timer associated with the synchronisation phase of a mobile station with a base station (valid only when the electronic circuit 100 operates in mobile station mode);

Tattach: timer associated with the attachment phase;

Temp: variable used to memorise whether or not a subscription procedure has been initiated (used only when the electronic circuit 100 operates in base station mode);

The read only memory 104 contains registers which, for convenience, each bear the same name as the data they contain;

"Program 1", in which the microprocessor operating program 103 is stored;

TSCAN: maximum time for a subscription procedure to succeed. For example, TSCAN may be equal to 5 minutes;

TLOCK: maximum time for a mobile station to synchronise with a base station. For example, TLOCK may be equal to 2 minutes;

TATTACH: maximum time for an attachment procedure to succeed. For example, TATTACH may be equal to 2 minutes.

The non-volatile memory 102 contains registers which, for convenience, each bear the same name as the data they contain:

"subscription_table", table in which data concerning the subscription are stored, such as the identity of the mobile station or the base station with which device 100 is registered. For a point to point system, the subscription table can only contain a single input at a time (a base station can only be registered with one mobile station and vice-versa);

"ACcode", containing the authentication code necessary for the subscription procedure;

"mode", containing the mode of operation of the electronic circuit 100, namely, mobile station or base station;

"identity", containing the identity of station 100.

Figure 2:
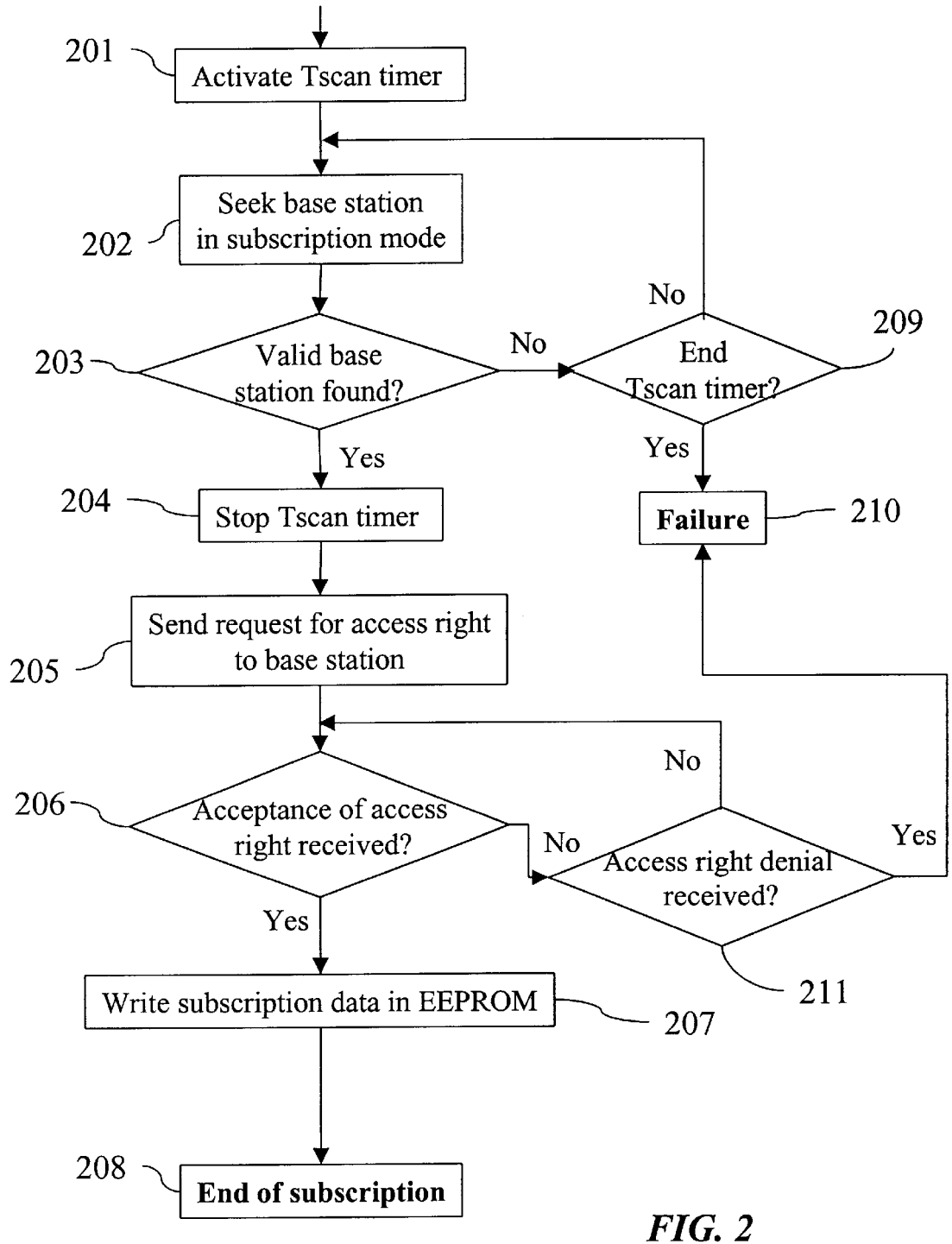
FIG. 2 is a flow diagram depicting the processings performed by a mobile station such as that in FIG. 1 in order to register with a base station, in a particular embodiment.

FIG. 2 depicts the processings performed by the microprocessor 103 of a mobile station such as the one illustrated in FIG. 1, in order to register with a base station.

A first step 201 consists in activating a timer, denoted Tscan. The Tscan timer is initialised at the TSCAN value, that is to say, the maximum time for a subscription procedure to succeed.

During the TSCAN period of time, the mobile station attempts to detect the presence of a base station in subscription mode (step 202). In order to do so, the mobile station radio unit 101 scans all the radio frequencies in the DECT standard (from 1880 MHz to 1900 MHz) until it finds a signal coming from a base station in subscription mode.

Each base station is identified by a unique global identity. Part of this identity contains a manufacturers code which makes it possible to identify the manufacturer of the base station, and a serial number allocated by the manufacturer.

When the mobile station detects the presence of a base station in subscription mode, it checks if the manufacturer's code, and, as an option, if the serial code or part of the serial code of the base station corresponds to a base station to which the mobile station is authorised to subscribe.

If the mobile station is authorised to subscribe to the base station detected, test 203 is positive and step 204 is then performed. This step consists in stopping the Tscan timer. Otherwise, if no valid base station is found before the Tscan time runs out ( test 203 negative and test 209 positive), the subscription procedure ends in failure 210.

Thus, if no base station has been activated in subscription mode during the TSCAN time period, subscription of the mobile station cannot be validated.

Following step 204 of stoppage of the Tscan timer, in step 205, the mobile station sends to the base station found a request for right of access, permitting the mobile station to register with the base station. In this request for right of access, the mobile station transmits the authentication code "ACcode" which it was allocated during manufacture.

Next, the mobile station awaits the reply from the base station to its request for right of access.

If the reply is positive (test 206 positive), step 207 is performed, consisting in updating the "subscription_table" to include the data of the subscription which has just been accepted. Thus, the next time the mobile station is turned on, subscription with the base station will still be valid. The subscription phase is then successfully completed (end of subscription designated by reference 208 in FIG. 2).

If the reply to the request for right of access is negative (test 206 negative and test 211 positive), the subscription procedure ends in failure 210.

Figure 3:
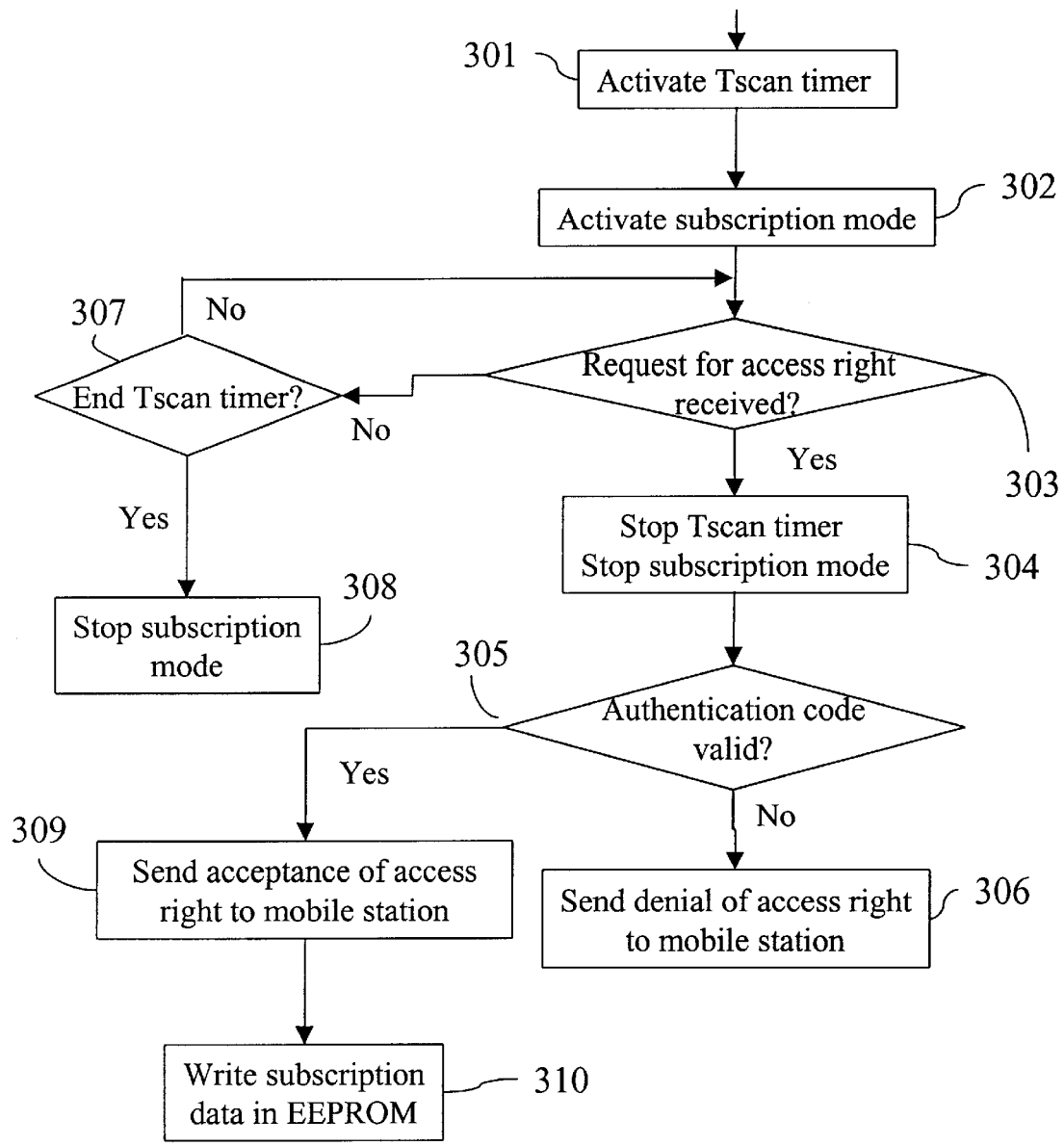
FIG. 3 is a flow diagram depicting the processings performed by a base station such as that in FIG. 1 in order to register a mobile station, in a particular embodiment.

FIG. 3 depicts the processings performed by microprocessor 103 of a base station such as the one illustrated in FIG. 1, in order to register a mobile station.

In order to initiate the subscription phase, during step 301, the base station activates a Tscan timer, which is initialised at the TSCAN value.

The following step 302 consists in activating the subscription mode of the base station. In order to do so, a particular bit of the signal transmitted by the base station is set to the logic value "1".

If, during the TSCAN period, no request for right of access is received from a mobile station (test 303 negative and test 307 positive), the subscription phase is stopped (step 308).

Thus, if no mobile station is in the subscription phase (depicted in FIG. 2) during the TSCAN period of time, the base station cannot validate any subscription.

When the base station receives a request for right of access from a mobile station (test 303 positive), the Tscan timer is stopped and the mode of subscription is invalidated (step 304), so that no other mobile station can request registration, given that the system only authorises one subscription at a time.

Then, during test 305, the base station checks the authentication code "ACcode" transmitted by the mobile station. If the code is valid (test 305 positive), the base station performs step 309. Otherwise (test 305 negative), the base station performs step 306.

Step 309 consists in sending to the mobile station a positive reply to its request for right of access. Next, during step 310, the base station enters the data concerning this mobile station in the table "subscription_table" stored in the EEPROM non volatile memory 102. Thus, the next time the base station is turned on, the mobile station subscription will still be valid. The subscription phase is then successfully completed.

Step 306 consists in sending to the mobile station notice of refusal of its request for right of access. The subscription phase then ends in failure.

The subscription procedure described above with reference to FIGS. 2 and 3 makes it possible to reduce the risks of undesired subscription of a mobile station to a base station by limiting the period during which subscription is possible to a TSCAN period of time. The TSCAN value must therefore be chosen so that it is sufficient to enable successful completion of a desired subscription between a mobile station and a base station, and sufficiently short to prevent acceptance of a non desired subscription.

FIGS. 2 and 3 describe only the course of the subscription phase, but do not describe the mode of activation thereof. The method of activation of the subscription phase will now be described with reference to FIGS. 4 and 5.

Figure 4:
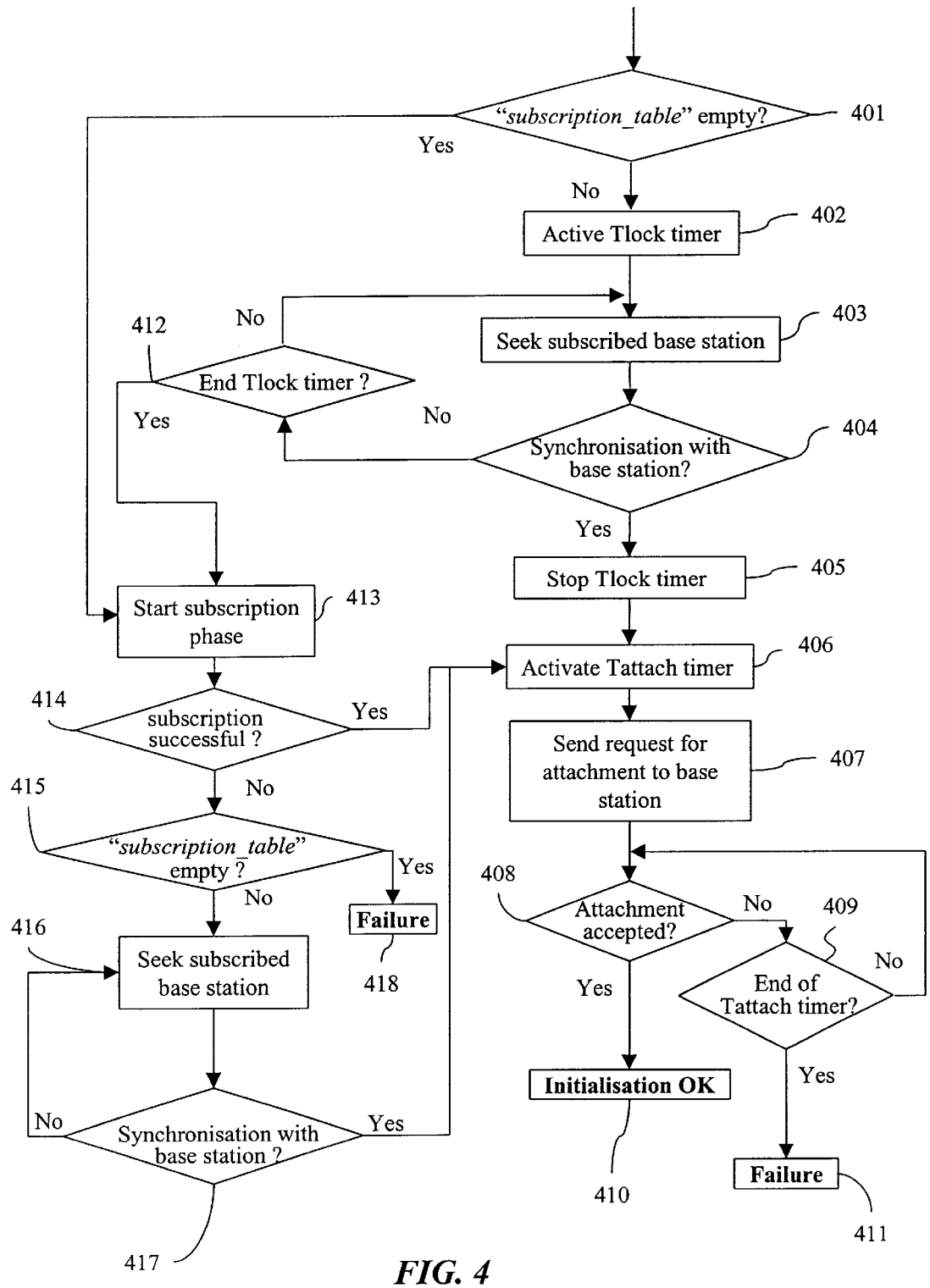
FIG. 4 is a flow diagram depicting the processings performed by a mobile station following power-up in order to synchronise with and to attach itself to a base station, in a particular embodiment.

FIG. 4 depicts the processings performed by the microprocessor 103 of a mobile station such as the one depicted in FIG. 1, following power-up, in order to synchronise with and to attach itself to a base station.

The mobile station starts by testing if it is registered with a base station. In order to do so, it tests the content of "subscription_table" (test 401).

If the mobile station is not registered with any base station, that is to say if "subscription_table" is empty (test 401 positive), a subscription phase (step 413) is then automatically started (without user intervention).

This phase of subscription has been described above with reference to FIG. 2.

If the mobile station is already registered with a base station BS1 (test 401 negative), then the automatic subscription procedure is not initiated. The mobile station will seek to synchronise with and to attach itself to the BS1 base station with which it is already registered.

In the course of step 402, the mobile station activates a Tlock timer which is initialised at the TLOCK value contained in the mobile station ROM 104.

Next, in step 403, the mobile station seeks the base station with which it is registered, by listening to the radio frequency channels corresponding to the DECT standard (from 1880 MHz to 1900 MHz), in order to detect the presence of the BS1 base station and, once the latter is detected, in order to synchronise with the signal emitted by BS1 (test 404).

If the mobile station does not find the BS1 base station before the Tlock timer runs out (test 404 negative and test 412 positive), a new subscription procedure then starts automatically (step 413). This step makes it possible to associate a mobile station with a new base station (for example to replace a defective base station by a new base station) without having to return the equipment to the factory, or have recourse to operator intervention to reprogram the non-volatile memory.

In the case where the mobile station has succeeded in synchronising with the base station before the Tlock timer runs out (test 404 positive), the latter is stopped during step 405. A new timer, Tattach, is then activated during step 406. It is initialised at the TATTACH value contained in the ROM 104 of the mobile station.

Next, during step 407, the mobile station sends a request for attachment to the BS1 base station. The mobile station then waits for the reply to its request from the BS1 base station. If no positive reply is received before the Tattach timer runs out (test 408 negative and test 409 positive), the procedure ends in failure 411. The mobile station is then unable to access the BS1 base station. The user must then re-start the system.

If a positive reply to the request for attachment is received (test 408 positive), initialisation of the mobile station with the BS1 base station is then successful, and the two stations can begin to communicate (step 410).

In the cases where an automatic subscription operation has been initiated (step 413), when the subscription phase is over, the mobile station tests the result of the subscription. If the result of the subscription is positive (test 414 positive), this means that the mobile station has been registered with a new base station BS2. In the case where the mobile station had already been registered with another BS1 base station, the former subscription is deleted in favour of the new subscription.

The mobile station then attempts to attach itself to the new BS2 base station, as described above, by running through steps 406 and 407.

If the subscription phase has not allowed the mobile station to register with a new base station (test 414 negative), the mobile station then tests if the table "subscription_table" is empty (test 415).

If so, the mobile station is not registered with any base station and cannot therefore communicate. There is failure (418). The user must re-start the mobile station in order to proceed to a new attempt at subscription.

Otherwise, the station is already registered with a BS1 base station; the mobile station will wait for this BS1 base station to become active again or come within its range so that it can synchronise with it (step 416 and test 417), and then attach itself to the BS1 base station (steps 406 and 407).

In the case where the mobile station is already registered with a BS1 base station, if the BS1 base station becomes active again during the subscription phase, the mobile station then stops the subscription phase and synchronises with the BS1 base station with which it is already registered.

The operations described in FIG. 4 make it possible to initiate the automatic subscription procedure in the following two cases only:
  if the mobile station is not registered with any base station,
  if the mobile station is registered with a base station with which it has not succeeded in synchronising during the TLOCK period of time.

In the first case, it is possible to proceed automatically to the first installation of a mobile station with a base station.

In the second case, it is possible to automatically replace the base station to which the mobile station is associated. So that the automatic reinstallation procedure functions correctly, the base station with which the mobile station was previously installed must be de-activated.

Figure 5:
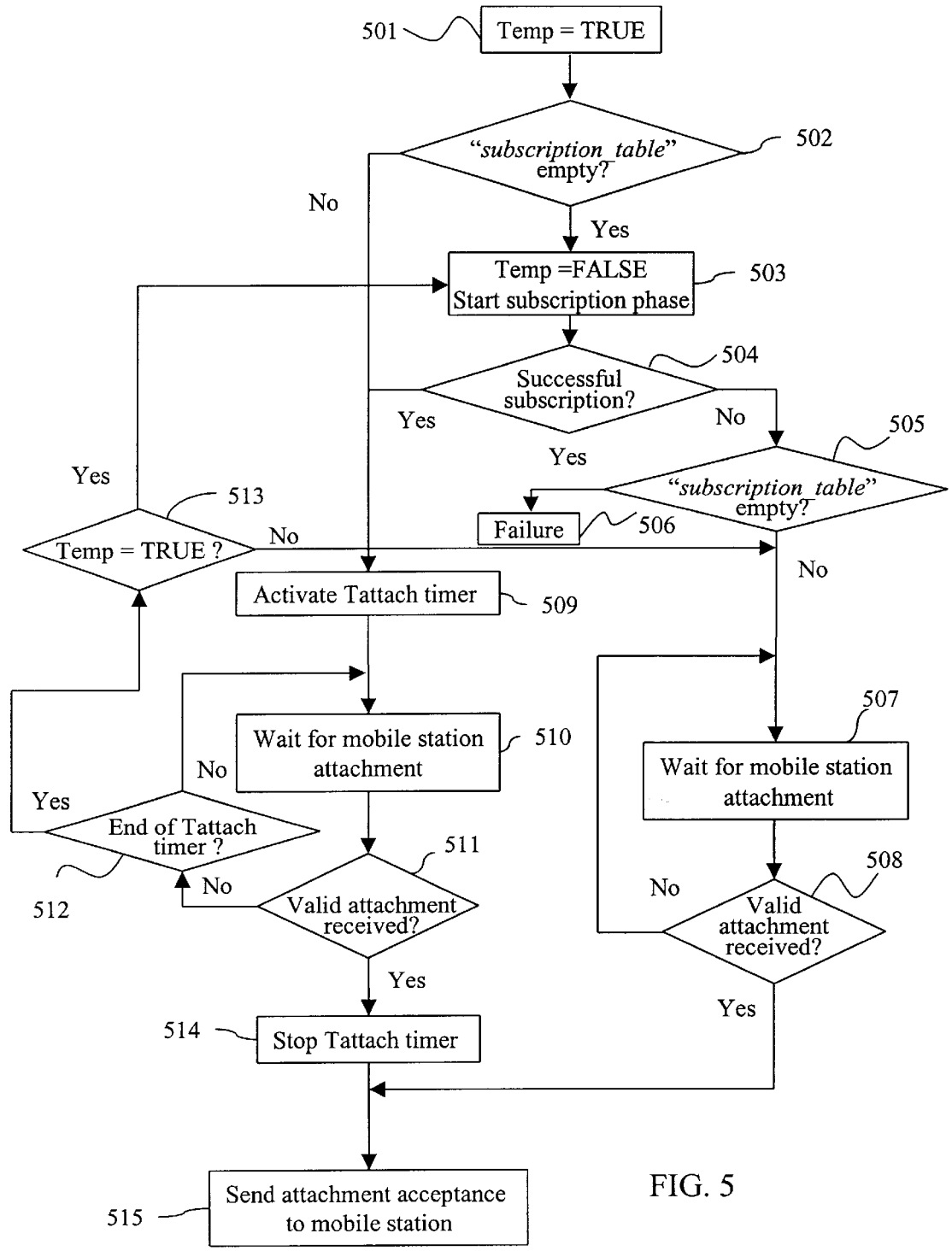
FIG. 5 is a flow diagram depicting the processings performed by a base station after power-up, in a particular embodiment.

FIG. 5 depicts the processings performed by the microprocessor 103 of a base station such as that depicted in FIG. 1, following power-up.

A first step 501 consists in initialising a temporary variable "Temp" at the TRUE value. The base station then tests if a mobile station has been registered with it (test 502).

If the table "subscription_table" is empty, the temporary variable "Temp" is then set at the FALSE value and a subscription phase, as described above with reference to FIG. 3, is automatically initiated (step 503).

If the table "subscription_table" is not empty, in the course of step 509, the base station activates a timer, Tattach, in order to receive a request for attachment from the mobile station with which the base station is registered. In what follows, MS1 designates the mobile station already registered with the base station. In step 509, the Tattach timer is initiated at the TATTACH value contained in the ROM 104 of the base station.

Next, in the course of step 510, the base station waits to receive a valid request for attachment from the MS1 mobile station with which it is registered.

If a valid request for attachment from MS1 is received before TATTACH runs out (test 511 positive), step 514, which consists in stopping the Tattach timer, is carried out. Then the procedure of initialisation of the base station with the MS1 mobile station ends with step 515, which consists in replying positively to the request for attachment of the MS1 mobile station.

If no request for attachment from the MS1 mobile station is received before the TATTACH period runs out (test 511 negative and test 512 positive), the base station tests the value of the temporary variable "Temp" in the course of test 513. If "Temp" is equal to TRUE (test 513 positive), this means that no subscription procedure has been initiated since the base station was turned on. This automatically starts a subscription procedure (step 503) by previously setting the "Temp" value to FALSE.

The automatic start of a subscription phase makes it possible to automatically reinstall the base station with a new mobile station. Such a situation arises for example in the case where the MS1 mobile station is defective.

If "Temp" is equal to FALSE (test 513 negative), it means that a subscription phase has already taken place since base station power-up. For security purposes, only one subscription phase is allowed per session. Therefore if test 513 is negative, the base station will wait for an unlimited time for a request for attachment from the MS1 mobile station (steps 507 and 508 positive). When a valid request for attachment is received (test 508 positive), step 515, already described above, is effected.

The base station may be led to start a subscription procedure in the following two cases:

no mobile station is registered with the base station, the MS1 mobile station registered with the base station has not sent a request for attachment before the TAT-TACH period has elapsed.

When the base station has completed the subscription phase, it then tests the result of this subscription.

If the subscription has been successful, a new mobile station MS2 has then succeeded in registering with the base station. The attachment waiting procedure for the MS2 mobile station is repeated from step 509.

If subscription has not succeeded, there are two possibilities (test 505):

no mobile station is registered with the base station (test 505 positive): the base station initialisation procedure has then failed. The user must re-start the system;

a mobile station is already registered, this is MS1. The base station then waits for an unlimited period of time for the request for attachment from MS1 (steps 507 and 508).

If a valid request for attachment from MS1 is received during the subscription phase, the subscription phase ends and operation 515 is then directly performed.

The processings which have just been described with reference to FIGS. 4 and 5 show the following results:

1. In order to proceed to the installation of a system comprising a mobile station MS1 and a base station BS1, in the event where neither of these two stations registered, the user must power up both stations MS1 and BS1 in such a way that the period of time between power-up of the two stations is lower than TSCAN. In this case, the two stations BS1 and MS1 will automatically initiate a subscription phase and register with one another.

2. If the user wishes to replace the base station BS1 by a new base station BS2, he must power up both stations MS1 and BS2 in such a way that:

the time period between power-up of MS1 and BS2 is less than TLOCK+TSCAN or the time period between power-up of BS2 and MS1 is less than TSCAN+TLOCK, TLOCK being lower than TSCAN, and the BS1 station having to remain inactive so as not to interfere with the registration procedure.

3. If the user wishes to replace the MS1 mobile station by an MS2 mobile station, he must power up both stations MS2 and BS1 in such a way that:

the time between power-up of MS2 and BS1 is less than TSCAN-TATTACH, or the time between power-up of BS1 and MS2 is less than TSCAN+TATTACH, TATTACH being lower than TSCAN, and the MS1 station having to remain inactive so as not to interfere with the subscription procedure.

What is claimed is:

1. Method of subscription of a mobile station with a base station, in a telecommunications network, comprising the steps of:

performing a test operation, following power-up of the mobile station, to test if the mobile station is not registered with any base station;

automatically performing a subscription operation with the base station, if the mobile station is not registered with any base station, following its power-up;

checking, for the mobile station, which is already registered with the base station, if, after a first predetermined period of time previously stored in the mobile station, the mobile station has succeeded in synchronizing with and attaching itself to the base station, with which the mobile station is already registered; and automatically performing a subscription operation, if the mobile station, after the first predetermined period of time, has not succeeded in synchronizing with and attaching itself to the base station, with which the mobile station is already registered.

2. Method according to claim 1, wherein during the test operation it is determined whether or not a subscription table stored in the mobile station contains data.

3. Method according to claim 1 or 2, wherein following power-up of the mobile station, if the mobile station is already registered with a base station, an initialization operation is performed, consisting in activating a timer by allocating to it a value equal to the first predetermined time period.

4. Method according to claim 1 or 2, wherein during the subscription operation, the mobile station performs a transmission operation, consisting in transmitting to the base station an authentication code.

5. Method according to claim 1 or 2, wherein a stoppage operation, consisting in stopping the subscription operation of said mobile station to said base station if the subscription operation has not succeeded before a second predetermined period of time has elapsed.

6. Mobile station in a telecommunications network, further comprising means adapted to implement a subscription method according to claim 1 or 2.

7. Subscription method of a base station to a mobile station, in a telecommunications network, comprising the steps of:

performing a test operation, following power-up of the base station, to test if the base station is not registered with any mobile station;

automatically performing a subscription operation, if the base station is not registered with any mobile station, following its power-up;

checking, if, after a first predetermined period of time, the base station has succeeded in synchronizing with and attaching itself to a mobile station, with which the base station is already registered; and automatically performing a subscription operation, if the base station, after the first predetermined period of time, has not succeeded in sychronizing with and attaching itself to the mobile station, with which the base station is already registered.

8. Method according to claim 7, wherein during the test operation, it is determined whether or not a subscription table stored in the base station contains data.

9. Method according to claim 7 or 8, wherein following power-up of the base station, if the base station already has the mobile station registered with it, an initialization operation is performed, consisting in activating a timer by allocating to it a value equal to a second predetermined period of time previously, stored in said base station.

10. Method according to claim 7 or 8, wherein during the subscription operation, the base station carries out a checking operation, consisting in checking an authentication code transmitted by the mobile station.

11. Method according to claim 7 or 8, wherein a stoppage operation is performed, consisting in stopping the subscription operation of the base station to the mobile station if said subscription operation has not succeeded before a third predetermined time has elapsed.

12. Base station in a telecommunications network, comprising means adapted to implement a subscription method according to claim 7 or 8.

13. Information storage means, readable by a computer or a microprocessor storing computer program instructions, that implements a subscription method according to claim 1, 2, 7, and 8.

14. Information storage means, partially or totally removable, readable by a computer or a microprocessor storing computer program instructions, that implements a subscription method according to claim 1, 2, 7, and 8.

15. Computer program product, comprising instruction sequences to implement a subscription method according to claim 1, 2, 7, and 8.

* * * * *

UNITED STATES PATENT AND TRADEMARK OFFICE
CERTIFICATE OF CORRECTION

PATENT NO. : 6,826,401 B1
DATED : November 30, 2004
INVENTOR(S) : Isabelle Morvan et al.

It is certified that error appears in the above-identified patent and that said Letters Patent is hereby corrected as shown below:

Column 9,
Line 45, "TSCAN+TLOCK," should read -- TSCAN-TLOCK, --.

Column 10,
Line 3, "time" should read -- time, --.
Line 13, "operation" should read -- operation, --.
Line 60, "time previously," should read -- time, previously --.

Signed and Sealed this

Twenty-fourth Day of January, 2006

JON W. DUDAS
*Director of the United States Patent and Trademark Office*